(12) United States Patent
Shafir

(10) Patent No.: US 10,871,318 B2
(45) Date of Patent: Dec. 22, 2020

(54) ICE MAKER

(71) Applicant: Roni Shafir, Herzliya (IL)

(72) Inventor: Roni Shafir, Herzliya (IL)

( * ) Notice: Subject to any disclaimer, the term of this patent is extended or adjusted under 35 U.S.C. 154(b) by 61 days.

(21) Appl. No.: 16/240,817

(22) Filed: Jan. 7, 2019

(65) Prior Publication Data
US 2020/0217572 A1 Jul. 9, 2020

(51) Int. Cl.
*F25C 1/24* (2018.01)
*F25D 31/00* (2006.01)
*F25B 13/00* (2006.01)
*F25D 21/00* (2006.01)

(52) U.S. Cl.
CPC ............... *F25C 1/24* (2013.01); *F25B 13/00* (2013.01); *F25D 21/006* (2013.01); *F25D 31/003* (2013.01)

(58) Field of Classification Search
CPC .......... F25C 1/24; F25B 13/00; F25D 21/006; F25D 21/06; F25D 21/12; F25D 31/003; F25D 31/005
See application file for complete search history.

(56) References Cited

U.S. PATENT DOCUMENTS 3,888,303 A * 6/1975 Skala ...................... A47J 27/17
165/300
9,939,170 B2 * 4/2018 Beer ...................... C12M 41/48

* cited by examiner

*Primary Examiner* — Emmanuel E Duke
(74) *Attorney, Agent, or Firm* — The Law Office of Joseph L. Felber

(57) ABSTRACT

The disclosure relates to an Ice maker. Specifically, the disclosure relates to an ice maker having a circulating coolant fluid that is separate and distinct from the circulating refrigerant used to control the coolant's temperature in a hot coolant reservoir and a cold coolant reservoir.

10 Claims, 1 Drawing Sheet

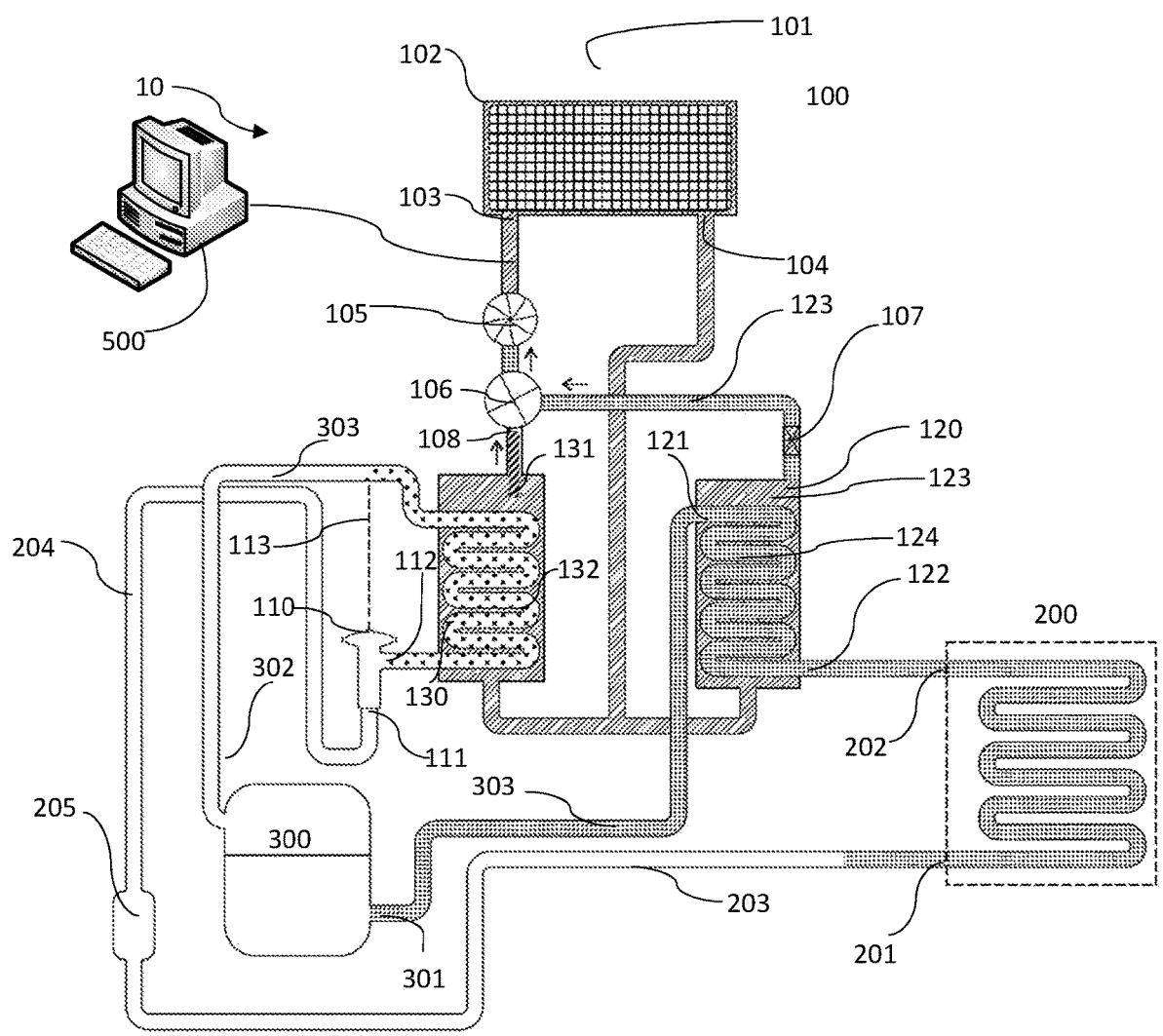

ICE MAKER

BACKGROUND

The disclosure is directed to an Ice maker. Specifically, the disclosure is directed to an ice maker having a circulating coolant fluid that is separate from the refrigerant used to control the coolant's temperature.

Ice makers are an integral part of the food service and hospitality industries.

Most ice makers operate with a similar technology. a refrigeration system streams cold gas into a freezer chamber or an evaporator, which is constructed at the shape of the ice sought to be made. During the freezing cycle water is sprayed or circulated onto the freezer chamber using a pump. When a sensor senses the ice is made and ready, a heat valve up, whereupon the compressor, acting as a heat pump, causes a warm gas to flow over the freezer, causing the ice cubes to be released into a storage container.

Depending on the device, the water temperature and other environmental conditions a production cycle takes between 15-30 minutes, while the process of releasing the cubes from the mold, the "harvest" takes about 5 minutes. The defrost cycle, or harvest is wasteful energy-wise, causing a decrease in overall yield and increases production costs. During operation, the compressor operates as a heat pump, with increased current demand, head pressure and load increase and valuable cooling time and capability is wasted. The transition between the cooling cycle, and the heating operation to release the cubes also shorten the system's life span These and other shortcoming are addressed by the following disclosure and claims.

SUMMARY

In an embodiment, provided is a system for freezing a liquid comprising: a jacketed freezer, sized and configured to accept a liquid to be frozen, the jacketed mold having an inlet and an outlet; a cold coolant reservoir in fluid communication with the jacketed mold; a hot coolant reservoir, in fluid communication with the jacketed mold; a compressor having an inlet and an outlet in fluid communication with the cold coolant reservoir, at least one of an expansion valve and a capillary tube, and the hot coolant reservoir; a condenser having an inlet and an outlet, in liquid communication with the hot coolant; at least one of the expansion valve and the capillary tube, having an inlet and an outlet, in fluid communication with the cold coolant reservoir and the condenser; a selector valve, in fluid communication with the cold coolant reservoir, the hot coolant reservoir, and the jacketed mold, configure to, when actuated, to divert the cold or hot coolant to the jacketed mold; at least one coolant pump, disposed between the selector valve and the jacketed mold inlet; and a refrigerant, configured to undergo liquid-gas phase change, wherein the refrigerant and the coolant are separated.

BRIEF DESCRIPTION OF THE DRAWINGS

The features of the ice maker system described, will become apparent from the following detailed description when read in conjunction with the drawings, which are exemplary, not limiting, and wherein like elements are numbered alike in several FIGURES and in which:

FIG. 1, shows schematic of the ice maker system

While the disclosure is amenable to various modifications and alternative forms, specifics thereof have been shown by way of example in the drawings and will be further described in detail herein below. It should be understood, however, that the intention is not to limit the disclosure to the particular embodiments described. On the contrary, the intention is to cover all modifications, equivalents, and alternatives.

DETAILED DESCRIPTION

The disclosure relates in one embodiment to an ice maker having a circulating coolant fluid that is separate from the refrigerant used to control the coolant's temperature.

In an embodiment, the cooling portion of the system cools the coolant to a freezing temperature using a heat exchanger that is positioned within a cold reservoir, forming a cold coolant bank. Conversely, a hot gas formed through the refrigerant's phase change is used to heat the coolant by flowing through another heat exchanger disposed within a hot coolant reservoir, thus forming a hot coolant bank. The hot coolant bank stores latent heat of the compressor operation, which can be used for defrosting in any refrigerators' and freezers' types (e.g., blast freezer), regardless of the use in the cold coolant bank, and can thus be used to replace other defrosting systems such as gas and heating elements.

The freezer chamber is jacketed, forming a jacketed mold, having an inlet and an outlet with the inlet connected to the cold coolant bank. A circulating pump is used to circulate the cold coolant until the ice in the freezer chamber is formed. The freezer chamber may form molds that are shaped with the jacketing forming the molds, thus enabling the formation of various cube forms, including spheroidal ice cubes.

Once a sensor in the freezer chamber identifies the cubes are formed and solid, for example by using at least one of a floating arm (mechanical sensors), optic sensors, thermistors and a combination thereof, a selector valve is opened up shutting off the flow of the cold coolant and diverting the hot coolant from the hot coolant reservoir. Once the cubes are released to a holding container, the freezer chamber can be filled again, the selector valve will shut off the hot coolant and divert into the jacketed freezer chamber the cold coolant from the cold coolant reservoir (or bank), and the cycle will restart.

For example, adding a thermistor in communication with the control system, allows in an embodiment to monitor the freezing temperature as well as making the freezing temperature dynamic and programmable. Maintaining a predetermined temperature differential ($\Delta T$), allows in an embodiment to take into consideration the thickness of the frozen volume's shape, the coolant temperature and the temperature of the liquid being frozen. Using the sensor to maintain a predetermined $\Delta T$, can prevent in another embodiment, the formation of a frozen foam that will act as an insulator and extend the freezing cycle time. Furthermore, the temperature sensor can have several interaction points with the system thus used to gather data that can be used to shorten cycle time, save energy and form a more uniform frozen volume. Moreover, using a multipoint temperature sensor can provide a better indication on when the frozen volume has reached the target temperature thus providing an indication the freezing cycle terminated.

Throughout the cooling and heating cycle, and in an embodiment, the compressor works continuously at full capacity, without interruption nor unnecessary load. The defrosting stage used to release the cubes is done by utilizing the heat emitted during the phase change of the refrigerant from gas to liquid during cooling cycle. By operating during the cooling/freezing cycle as well, the compressor prepares the cold coolant bank for the next cooling cycle, and shortens the total cycle time. Moreover, the heat generated by the compressor can be utilized as a stand-alone system for use in defrosting freezers and other refrigeration systems. Accordingly and in an embodiment, provided herein is a system comprising a compressor in communication with a heat exchangers immersed in a liquid adapted and configured to defrost, and/or otherwise raise the temperature of a jacketed mold, the system further comprising a compressible gas. The defrosting liquid can be for example, glycol, or water and the like.

The coolant can be for example, a liquid that does not freeze at the ice freezing temperatures, nor evaporates at the heating or defrosting temperature. Example of the coolant used can be, salt water, propylene glycol, or the like, although many other fluids could be employed. The freezer chamber design can be configured to increase the freezing surface area, thus substantially reducing the freezing time. Since the coolant flow can be affected using flexible tubes, the molds can be made at any shape that would form half of a symmetric shape, which can be adjoined to form complex shape such as spheroids and other shapes.

Accordingly, provided herein is a system for freezing or defrosting a liquid comprising: at least one of a jacketed mold, sized and configured to contain a liquid to be frozen, the jacketed mold having an inlet and an outlet; a cold coolant reservoir in fluid communication with the jacketed mold; a hot coolant reservoir, in fluid communication with the jacketed mold; a compressor having an inlet and an outlet in fluid communication with at least one of an expansion valve and a capillary tube with the cold coolant reservoir and the hot coolant reservoir; a condenser having an inlet and an outlet, in liquid communication with the hot coolant reservoir and an expansion valve; at least one of the expansion valve and the capillary tube, having an inlet and an outlet, in fluid communication with the cold coolant reservoir and the condenser; a selector valve, in fluid communication with the cold coolant reservoir, the hot coolant reservoir, and the jacketed mold, configure to divert the cold or hot coolant to the jacketed mold; a coolant pump, disposed between the selector valve and the jacketed mold inlet; and a refrigerant, configured to undergo liquid-gas phase change, wherein the refrigerant and the coolant are separated.

The term "fluid communication" may suggest a route and/or system of routes for the flow of a fluid. The term "fluid communication" may also suggest the traveling and/or transporting of a fluid. The term "fluid communication" may include [but is not limited to] the general ability or capacity for fluid to flow between the parts, sections, or components under consideration. Furthermore, the term "fluid communication" as used herein refers to a connection between two or more elements, wherein such connection allows for the one-way or bi-directional flow of a fluid, whether in its liquid or gaseous form.

Detailed embodiments of the present technology are disclosed herein; however, it is to be understood that the disclosed embodiments are merely exemplary, which can be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the sensor(s) includes one or more sensors). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In addition, for the purposes of the present disclosure, directional or positional terms such as "top", "bottom", "upper," "lower," "side," "front," "frontal," "forward," "rear," "rearward," "back," "trailing," "above," "below," "left," "right," "horizontal," "vertical," "upward," "downward," "outer," "inner," "exterior," "interior," "intermediate," etc., are merely used for convenience in describing the various embodiments of the present disclosure.

The term "coupled", including its various forms such as "operably coupled", "coupling" or "coupleable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

A more complete understanding of the components, processes, assemblies, and devices disclosed herein can be obtained by reference to the accompanying drawings. These FIGURES (also referred to herein as "FIG.") are merely schematic representations (e.g., illustrations) based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1, illustrates a schematic representation of the icemaker system. As illustrated, system 10 comprises jacketed 102 mold 101, sized and configured to contain a liquid to be frozen. The liquid can be water, ice pops, ice creams or other liquids sought to be frozen. Jacketed 102 mold 101, also has inlet 103 and outlet 104. Further shown is cold coolant reservoir 130 in fluid communication with jacketed 102 mold 101. Also shown is hot coolant reservoir 120, in fluid communication with jacketed 102 mold 101.

Compressor 300 is illustrated having inlet 301 and outlet 302, being in fluid communication with cold coolant reservoir 130 and hot coolant reservoir 120. Likewise, condenser 200 has inlet 202 and outlet 201, being in liquid communication with hot coolant reservoir 120 and an expansion valve 110. The expansion valve 110, also having an inlet 111 and outlet 112, as well as capillary tube 113, in fluid communication with cold coolant reservoir 130 and condenser 200. Selector valve 106, in fluid communication with cold coolant reservoir 130, hot coolant reservoir 120, and freezer chamber 100 having jacketed 102 container 101, configured to, when actuated, to divert cold 130 or hot 120 coolant to freezer chamber 100 having jacketed 102 container 101. In addition, coolant pump 105 is disposed between selector valve 106 and inlet 103 of freezer chamber 100 having jacketed 102 container 101. Further, the system comprises refrigerant, configured to undergo liquid-gas phase change, wherein the refrigerant and the coolant are separated. The refrigerant can be, for example, 1,1,1,2-Tetrafluoroethane, Difluoromethane, Pentafluoroethane, 1,1,1-Tetrafluoroethane, or their combination. It stands to reason that additional pumps and valves can be added to the system depending on various decision factors, such as control, environmental considerations, safety and the like. For example various check valves can be distributed throughout the system to ensure unidirectional flow of coolant as designed.

Also, cold coolant reservoir 130 comprises first vat 131 having heat exchanger 132 in liquid communication with expansion valve 110, heat exchanger 132 configured to evaporate the liquid refrigerant. In an embodiment, gaseous refrigerant is discharged out from compressor 300 reaches condenser 200 where, being cooled down, condenses into liquid. Flowing into line 203 it passes through drier filter 205, then into expansion valve 110 inlet 111, where the change in line diameter causes the refrigerant to change stage from liquid to gas, adsorbing the latent heat of vaporization from the coolant in vat 131 through the walls of heat exchanger 132, and cooling the coolant to a temperature of between about −5° C. and about −25° C. In addition, hot coolant reservoir 120 comprises second vat 123 having heat exchanger 124 in liquid communication with condenser 200 and compressor 300, heat exchanger 124 configured to condense the gaseous refrigerant. Through phase change between gas and liquid, latent heat of condensation is transferred from the refrigerant to the coolant through heat exchanger 124, thus heating the coolant to a temperature of between about 10° C. and about 50° C.

System 10, can further comprises a computerized control, in communication with the coolant pump, the selector valve, the expansion valve, and an array of sensors.

While in the foregoing specification the ice maker has been described in relation to certain embodiments, and many details are set forth for purpose of illustration, it will be apparent to those skilled in the art that the disclosure of the self-adjusting wrench is susceptible to additional embodiments and that certain of the details described in this specification and as are more fully delineated in the following claims can be varied considerably without departing from the basic principles of this invention.

I claim:
1. A system for freezing or defrosting a liquid comprising:
 a. at least one of a jacketed mold, sized and configured to contain a liquid to be frozen, the jacketed mold having an inlet and an outlet;
 b. a cold coolant reservoir in fluid communication with the jacketed mold;
 c. a hot coolant reservoir, in fluid communication with the jacketed mold;
 d. a compressor having an inlet and an outlet in fluid communication with at least one of an expansion valve and a capillary tube with the cold coolant reservoir and the hot coolant reservoir;
 e. a condenser having an inlet and an outlet, in liquid communication with the hot coolant reservoir and an expansion valve;
 f. at least one of the expansion valve and the capillary tube, having an inlet and an outlet, in fluid communication with the cold coolant reservoir and the condenser;
 g. a selector valve, in fluid communication with the cold coolant reservoir, the hot coolant reservoir, and the jacketed mold, configure to divert the cold or hot coolant to the jacketed mold;
 h. a coolant pump, disposed between the selector valve and the jacketed mold inlet; and
 i. a refrigerant, configured to undergo liquid-gas phase change, wherein the refrigerant and the coolant are separated.
2. The system of claim 1, wherein the cold coolant reservoir comprises a first vat having a heat exchanger in liquid communication with at least one of the expansion valve and the capillary tube, the heat exchanger configured to evaporate the liquid refrigerant.
3. The system of claim 2, wherein the hot coolant reservoir comprises a second vat having a heat exchanger in liquid communication with the condenser and the compressor, the heat exchanger configured to condense the gaseous refrigerant.
4. The system of claim 1, wherein the coolant is glycol.
5. The system of claim 4, wherein the cold coolant reservoir is configured to cool the coolant to a temperature of between about −5° C. and about −25° C.
6. The system of claim 5, wherein the hot coolant reservoir is configured to heat the coolant to a temperature of between about 10° C. and about 50° C.
7. The system of claim 1, wherein the coolant is configured to flow using flexible pipes.
8. The system of claim 1, wherein a container portion of the jacketed mold is configured to produce shaped ice.
9. The system of claim 1, further comprises a computerized control, in communication with the coolant pump, the selector valve, the expansion valve, and an array of sensors.
10. The system of claim 1, wherein the hot coolant reservoir is used to defrost at least one of a refrigerator and a freezer not associated with the jacketed freezer, and/or the jacketed mold.

* * * * *